May 19, 1931.   R. C. HOPKINS   1,806,460
MOBILE BLOWER UNIT
Filed Jan. 28, 1929   2 Sheets-Sheet 1

Inventor
Robert C. Hopkins
By Harry Frease
Attorney

May 19, 1931.  R. C. HOPKINS  1,806,460
MOBILE BLOWER UNIT
Filed Jan. 28, 1929   2 Sheets-Sheet 2

Inventor
Robert C. Hopkins
By Harry Frease
Attorney

Patented May 19, 1931

1,806,460

UNITED STATES PATENT OFFICE

ROBERT C. HOPKINS, OF ALLIANCE, OHIO

MOBILE BLOWER UNIT

Application filed January 28, 1929. Serial No. 335,637.

The invention relates to a movable support for a blower and the like, whereby the blower may be supported directly on the floor or wheeled from place to place.

The objects of the improvement are to provide a blower having a three-point traction suspension by means of which the blower may be easily moved from place to place, a combination screw and lever mechanism being provided for easily and readily lowering the blower to stationary contact with the floor and raising the traction wheels out of contact with the floor, whereby the blower may be mounted in stationary position at any desired location before the same is placed in operation.

Figure 1:
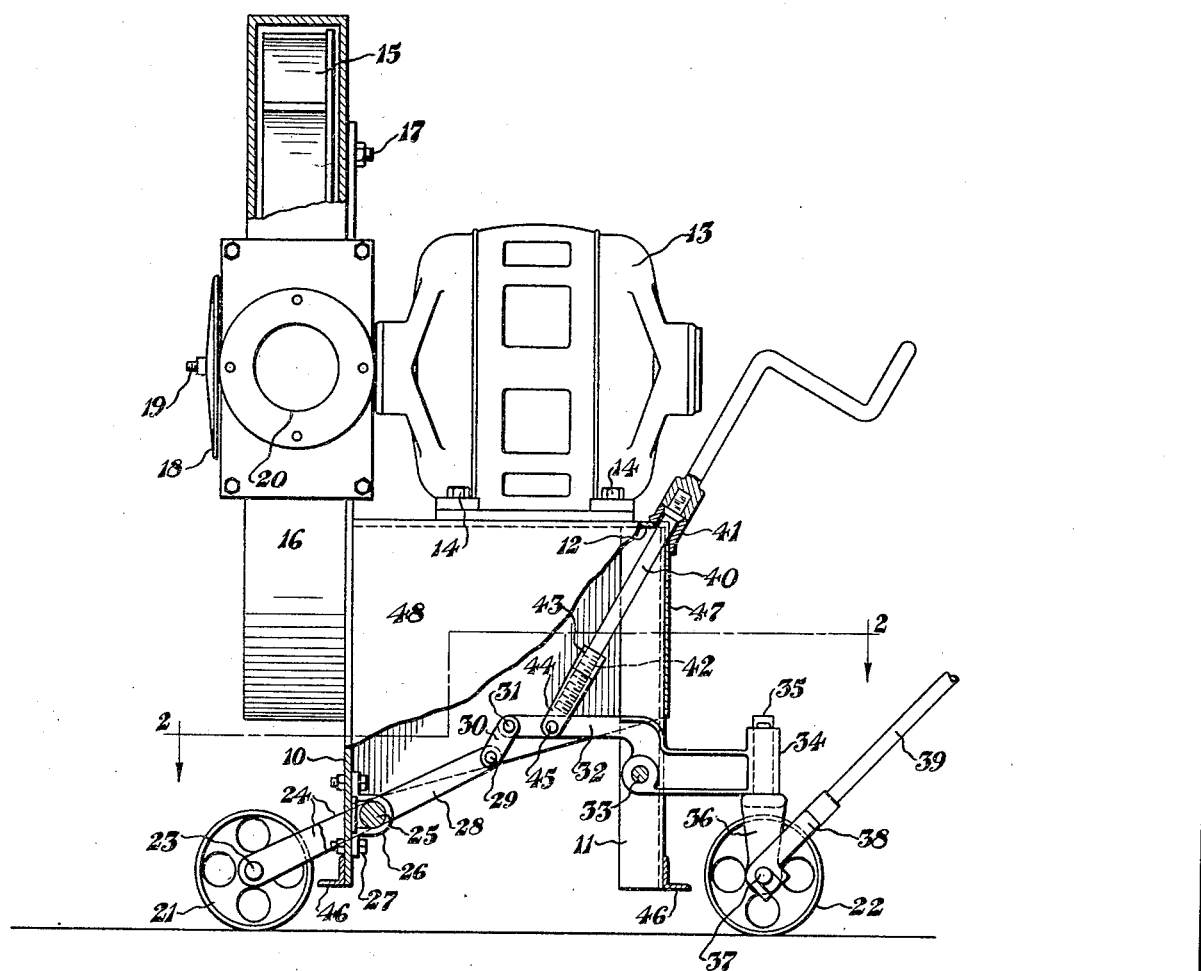
Figure 2:
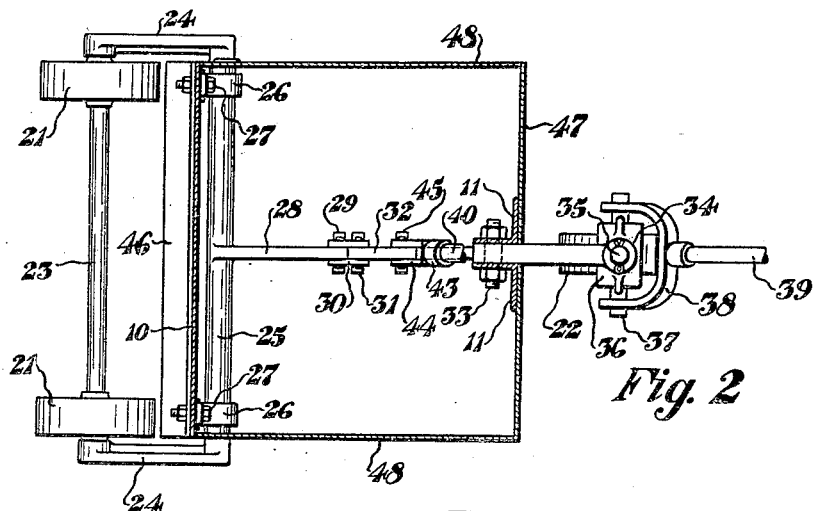

An embodiment of the invention is illustrated in the accompanying drawings, in which Figure 1 is a side elevation of the improved blower, parts being broken in section for the purpose of illustrating the lever and screw mechanism for raising and lowering the traction wheels, and the blower fan;

Fig. 2, a plan sectional view taken substantially on the line 2—2, Fig. 1; and

Figure 3:
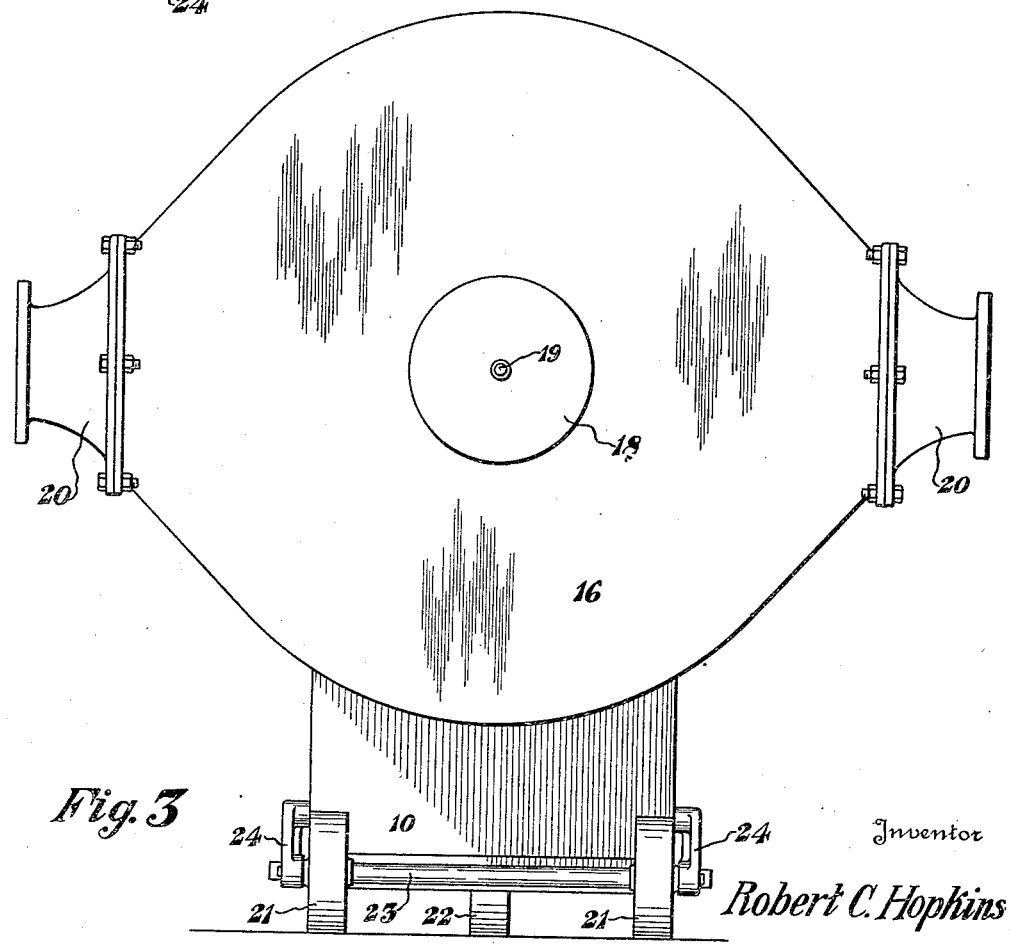

Fig. 3, a front elevation of the blower.

Similar numerals refer to similar parts throughout the drawings.

The motor and fan support may comprise the substantially vertical plate 10 and the spaced pair of angle irons 11, the lower ends of which all terminate in substantially the same horizontal plane, a top plate 12 being secured to the upper ends of the angle irons and to one side of the plate 10.

The motor 13, of any suitable construction, is mounted upon the top plate 12, being connected thereto as by the bolts 14 and is operatively connected to the fan 15 mounted within the blower casing 16, which is supported upon the vertical plate 10, being connected thereto as by bolts 17.

For the purpose of regulating the amount of air to be taken into the central inlet opening of the blower casing, a disk 18 may be adjustably mounted over the opening as upon the screw threaded shaft 19 whereby the disk may be moved toward or from the casing to decrease or increase, respectively, the amount of air taken into the blower casing.

The blower casing may be provided with a plurality of outlets around its periphery as indicated generally at 20, any desired number and spacing of the outlets being provided in order to distribute the air from the blower throughout the kiln or other apparatus being cooled.

For the purpose of easily moving the blower from place to place, traction wheels are provided, there being preferably two spaced rear wheels 21 and one dirigible front wheel 22 whereby the device has a three-point traction suspension.

The rear wheels 21 are mounted upon an axle 23 carried by the rocker arms 24 which are mounted upon opposite ends of the rocker shaft 25, journaled in bearings 26 fixed upon the vertical plate 10 as by the bolts 27.

A rocker arm 28 is fixed to the central portion of the rocker shaft 25 and pivotally connected as at 29 to the link 30, the other end of which is pivoted as at 31 to the inner end of a lever 32 fulcrumed, intermediate its ends, as at 33, between the upright angle members 11.

The forward extremity of the lever 32 is provided with a substantially vertical bearing portion 34 within which is journaled a stud shaft 35 carrying a depending bifurcation 36 within which the axle 37 of the front wheel 22 is mounted.

For the purpose of pulling the blower from place to place and steering the front wheel, a yoke 38 may be connected to the axle 37 and provided with a handle 39.

In order to raise the traction wheels and lower the supporting frame, a screw mechanism may be provided including the crank 40 journaled in a bearing 41 carried at the upper front corner of the supporting frame. The lower end of this crank is screw threaded as shown at 42 for engagement with the nut 43 having the bifurcated portion 44 pivoted as at 45 to the inner portion of the lever 32.

Angle feet 46 are preferably provided at the lower ends of the vertical plate 10 and angle members 11 for contact with the floor when the wheels are raised, thus providing for locating the blower in stationary position at any desired point. Front and side plates or sheets 47 and 48, respectively, may be connected to the motor support, providing a housing for the lifting and lowering mechanism above described.

A self-locking feature is present in this construction for preventing jarring noises when the blower is running by tightening up the entire mechanism. This is accomplished by raising the wheels sufficiently to lower the feet 46 into contact with the floor and then turning the crank screw just sufficiently to throw a little weight on the wheels, the whole train of mechanism thus being under a slight strain that will prevent vibration.

I claim:

1. In a motor-blower unit, a support, a rocker shaft journaled upon the support, a pair of spaced rocker arms fixed to the end portions of the shaft, and a pair of rear wheels carried by said arms, a central rocker arm upon the rocker shaft, a lever fulcrumed upon the support, a front wheel carried by one end of the lever, a link connecting the other end of the lever to the central rocker arm, and a screw operatively connected to said lever between its fulcrum and the link for raising the wheels to permit the support to rest upon the floor.

2. In a motor-blower unit, a support, a rocker shaft journaled upon the support, a spaced pair of rocker arms fixed to the end portions of the shaft, and a pair of rear wheels carried by said arms, a central rocker arm upon the rocker shaft, a lever fulcrumed upon the support, a front wheel journaled upon one end of the lever, a link connecting the other end of the lever to the central rocker arm, and a screw operatively connected to said lever between its fulcrum and the link for raising the wheels to permit the support to rest upon the floor.

3. In a motor-blower unit, a support, a rocker shaft journaled upon the support, a spaced pair of rocker arms fixed to the end portions of the shaft, and a pair of rear wheels carried by said arms, a central rocker arm upon the rocker shaft, a lever fulcrumed upon the support, a front wheel carried by one end of the lever, a link connecting the other end of the lever to the central rocker arm, a screw operatively connected to said lever between its fulcrum and the link for raising the wheels to permit the support to rest upon the floor, and a handle operatively associated with the front wheel for moving the blower upon the floor.

4. In a motor-blower unit, a support, a rocker shaft journaled upon the support, a spaced pair of rocker arms fixed to the end portions of the shaft, a pair of wheels carried by said arms, a central rocker arm upon the rocker shaft, a lever fulcrumed upon the support, a front wheel journaled upon one end of the lever, a link connecting the other end of the lever to the central rocker arm, a nut pivotally mounted on the lever and held against axial rotation, and a shaft journaled on the support and screwed into the nut, whereby rotation of the shaft raises the wheels to permit the support to rest upon the floor.

In testimony that I claim the above, I have hereunto subscribed my name.

ROBERT C. HOPKINS.